US006460632B1

(12) United States Patent
Chatterji et al.

(10) Patent No.: US 6,460,632 B1
(45) Date of Patent: Oct. 8, 2002

(54) METHODS OF DRILLING WELL BORES

(75) Inventors: Jiten Chatterji, Duncan, OK (US);
Roger S. Cromwell, Walters, OK (US);
Bobby J. King, Duncan, OK (US);
Frank Zamora, Duncan, OK (US);
Ronald J. Crook, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/117,746

(22) Filed: Apr. 5, 2002

(51) Int. Cl.[7] .............................. C09K 7/02; C09K 7/08; E21B 21/06; E21B 21/14
(52) U.S. Cl. .......................... 175/66; 166/309; 175/69; 210/747; 210/805; 507/102; 507/131
(58) Field of Search ................................. 166/309, 311, 166/312; 175/66, 69; 210/747, 805; 507/102, 131, 202, 245

(56) References Cited

U.S. PATENT DOCUMENTS

| | | | | |
|---|---|---|---|---|
| 3,303,896 A | * | 2/1967 | Tillotson et al. | 175/69 |
| 3,610,340 A | * | 10/1971 | Hutchison et al. | 175/69 |
| 4,232,741 A | * | 11/1980 | Richardson et al. | 166/270 |
| 4,301,016 A | * | 11/1981 | Carriere et al. | 507/119 |
| 4,486,316 A | * | 12/1984 | Carriere et al. | 507/119 |
| 5,215,596 A | * | 6/1993 | Van Slyke | 175/66 |
| 5,385,206 A | | 1/1995 | Thomas | 166/269 |
| 5,591,701 A | | 1/1997 | Thomas | 507/240 |
| 6,148,932 A | * | 11/2000 | Argillier et al. | 166/312 |
| 6,286,601 B1 | * | 9/2001 | Argillier et al. | 166/309 |

* cited by examiner

Primary Examiner—George Suchfield
(74) Attorney, Agent, or Firm—Craig W. Roddy; C. Clark Dougherty, Jr.

(57) ABSTRACT

Improved methods of drilling well bores utilizing foamed aqueous drilling fluids are provided. The methods basically comprise circulating an aqueous drilling fluid containing a single foaming and defoaming surfactant and a gas downwardly through a rotary drill pipe and drill bit connected thereto. Well bore cuttings generated by the drill bit are lifted to the surface by foam produced from the aqueous drilling fluid and gas. Upon reaching the surface, the foamed aqueous drilling fluid is defoamed whereby the cuttings and gas are removed therefrom and the aqueous drilling fluid is combined with additional foaming surfactant when needed and additional gas. The foaming and defoaming of the aqueous drilling fluid are accomplished by changing the pH of the aqueous drilling fluid from basic to acidic which causes the single foaming and defoaming surfactant to foam and defoam the aqueous drilling fluid.

23 Claims, No Drawings

METHODS OF DRILLING WELL BORES

BACKGROUND OF THE INVENTION

1. Field of the Invention

The present invention relates to methods of drilling well bores with foamed aqueous drilling fluids.

2. Description of the Prior Art

Methods of using air or other gas foamed drilling fluids for drilling well bores have been known and used heretofore. One such prior art method utilizes a drilling fluid comprised of an aqueous solution containing two surfactants which is circulated with a gas downwardly through a rotary drill pipe and drill bit connected thereto. As the aqueous solution and gas flows through the drill pipe and drill bit, the aqueous solution is foamed. Well bore cuttings generated by the drill bit are readily lifted to the surface by the foamed solution produced. When the foamed solution containing the cuttings reaches the surface, it is defoamed whereby the cuttings and gas are removed therefrom. The foaming and defoaming of the drilling fluid has heretofore been accomplished by including an anionic surfactant or cationic surfactant and an amphoteric surfactant in the drilling fluid. The mixture of surfactants causes the drilling fluid to be foamed by the gas and the foamed drilling fluid to be defoamed in response to pH changes made to the drilling fluid.

The method of foam drilling described above and other similar methods employ less water than conventional drilling fluids. As a result, the reduction in drilling fluid volume minimizes disposal costs and environmental problems associated with the disposal. While such foamable and defoamable drilling fluids have achieved varying degrees of commercial success, there are needs for improved methods of drilling well bores with foamable and defoamable drilling fluids which utilize less surfactants and as a result are less costly to use for drilling well bores.

SUMMARY OF THE INVENTION

The present invention provides improved methods of drilling well bores with foamed drilling fluids which meet the needs described above and overcome the deficiencies of the prior art. The methods of the present invention basically comprise the following steps. An aqueous drilling fluid containing a single surfactant, i.e., a tertiary alkylamine ethoxylate foaming and defoaming surfactant, is provided. The surfactant causes the aqueous drilling fluid to foam when mixed with air or other gas and the aqueous drilling fluid has a pH of about 10 or above. The surfactant also causes the aqueous drilling fluid to defoam when the aqueous drilling fluid has a pH of about 5 or below. The pH of the aqueous drilling fluid is raised to about 10 or above and the aqueous drilling fluid is combined with air or other gas and circulated through a rotary drill pipe and a drill bit connected thereto. As the aqueous drilling fluid and gas flow through the drill pipe and drill bit, the aqueous drilling fluid is converted to a foam. The foamed aqueous drilling fluid discharged from the drill bit lifts well bore cuttings produced by the drill bit to the surface. Upon reaching the surface, the pH of the aqueous drilling fluid containing the surfactant is lowered to about 5 or below which causes the foamed aqueous drilling fluid to be defoamed. When defoamed, the cuttings and gas in the foamed aqueous drilling fluid are separated therefrom. Thereafter, the steps of combining additional gas and additional surfactant when required with the aqueous drilling fluid, raising the pH of the aqueous drilling fluid, lowering the pH of the aqueous drilling fluid and separating the cuttings and gas from the aqueous drilling fluid are repeated until the well bore is drilled to total depth.

The objects, features and advantages of the present invention will be readily apparent to those skilled in the art upon a reading of the description of preferred embodiments which follows.

DESCRIPTION OF PREFERRED EMBODIMENTS

The present invention provides improved methods of drilling well bores using foamed drilling fluids. The methods are basically comprised of the following steps. An aqueous drilling fluid containing a single tertiary alkylamine ethoxylate foaming and defoaming surfactant is provided. The presence of the surfactant in the aqueous drilling fluid causes the aqueous drilling fluid to foam when mixed with air or other gas at a pH of about 10 or above and causes the aqueous drilling fluid to defoam when the aqueous drilling fluid has a pH of about 5 or below. The pH of the aqueous drilling fluid containing the surfactant is raised to about 10 or above and the aqueous drilling fluid is combined with a gas. The aqueous drilling fluid and gas are circulated through a rotary drill pipe and a drill bit whereby foam produced from the aqueous drilling fluid and gas lifts well bore cuttings produced by the drill bit to the surface. When the foamed aqueous drilling fluid and cuttings reach the surface, the pH of the foamed aqueous drilling fluid is lowered to about 5 or below so that the foamed aqueous drilling fluid is defoamed and the cuttings can be readily separated from the aqueous drilling fluid. Thereafter, the cuttings are separated from the aqueous drilling fluid and the steps set forth above are repeated until the well bore reaches total depth.

The water utilized to form the aqueous drilling fluid utilized in accordance with the methods of this invention is preferably fresh water, but any source of water can be utilized which does not adversely react with the foaming and defoaming surfactant.

The single foaming and defoaming surfactant which is useful in accordance with this invention is a tertiary alkylamine ethoxylate surfactant. The surfactant has the following structural formula when the pH of the aqueous drilling fluid containing the surfactant is raised to about 10 or above.

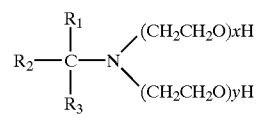

As mentioned above, at the pH of about 10 or above, the surfactant functions as a foaming surfactant so that when the aqueous drilling fluid containing the surfactant is mixed with a gas, preferably air, a foam is formed.

The surfactant has the following structural formula when the pH of the aqueous drilling fluid containing it is lowered to about 5 or below.

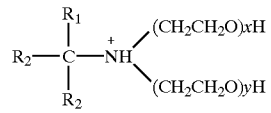

At a pH of about 5 or below, the surfactant functions as a defoamer whereby the gas in the foam is separate from the aqueous drilling fluid and cuttings in the aqueous drilling fluid can readily be separated therefrom.

$R_1$, $R_2$ and $R_3$ in the above structural formulas are each alkyl radicals having in the range of from about 12 to about 14 carbon atoms, preferably about 14 carbon atoms. x and y in the formulas are each integers in the range of from about 2 to about 15, more preferably from about 10 to about 15 and most preferably about 15.

The gas combined with the aqueous drilling fluid can be any of a variety of gases such as air, nitrogen, carbon dioxide, or methane. Of these, air is preferred. When air is utilized, it is preferably compressed and injected into the aqueous drilling fluid downstream of the pump or pumps used to circulate the aqueous drilling fluid downwardly through the rotary drill pipe and drill bit and upwardly through the well bore. The air or other gas utilized is generally combined with the aqueous drilling fluid in an amount in the range of from about 50% to about 80% by volume of the aqueous drilling fluid. The tertiary alkylamine ethoxylate foaming and defoaming surfactant is combined with the aqueous drilling fluid in a general amount in the range of from about 0.1% to about 5% by volume of the aqueous drilling fluid, preferably in an amount of about 2.5% by volume of the aqueous drilling fluid.

When the pH of the aqueous drilling fluid is raised to about 10 or above in order to cause the tertiary alkylamine ethoxylate foaming and defoaming surfactant to foam the aqueous drilling fluid and gas, a base is combined with the aqueous drilling fluid. That is, a base is combined with the aqueous drilling fluid after the gas and drill bit cuttings have been separated from the aqueous drilling fluid on the surface. The base can be combined with the aqueous drilling fluid in any convenient manner including by injecting the base into the aqueous drilling fluid on-the-fly downstream of the aqueous drilling fluid circulation pump or pumps. A pH metering instrument can be utilized to control the quantity of base combined with the aqueous drilling fluid. Examples of bases which can be utilized include, but are not limited to, sodium hydroxide, sodium carbonate, potassium hydroxide and hydrated lime. Of these, sodium carbonate is generally preferred.

When the pH of the foamed aqueous drilling fluid containing cuttings reaches the surface, the foam is defoamed by lowering the pH of the aqueous drilling fluid to about 5 or below by combining an acid with the foamed aqueous drilling fluid. Examples of acids which can be utilized include, but are not limited to, glacial acetic acid, hydrochloric acid, sulfuric acid and formic acid. Of these, glacial acetic acid is preferred. A pH metering instrument can be utilized to control the quantity of acid combined with the foamed aqueous drilling fluid. A buffer can also be utilized to make the foamed aqueous drilling fluid acidic. That is, a buffer consisting of 0.1 molar potassium di-hydrogen phosphate and 0.1 molar sodium hydroxide can be utilized.

Thus, the present invention provides an improved method of drilling a well bore whereby an aqueous drilling fluid and a gas is circulated downwardly through a rotary drill pipe and drill bit, and well bore cuttings generated by the drill bit are lifted to the surface by a foamed aqueous drilling fluid produced from the aqueous drilling fluid and gas. The foamed aqueous drilling fluid is defoamed whereby the cuttings and gas are removed therefrom and the aqueous drilling fluid is recirculated. In accordance with the improvement of the present invention the following steps are carried out: (a) combining a gas and a single tertiary alkylamine ethoxylate foaming and defoaming surfactant with an aqueous drilling fluid, the surfactant causing the aqueous drilling fluid to foam at an aqueous drilling fluid pH of 10 or above and causing the aqueous drilling fluid to defoam at an aqueous drilling fluid pH of about 5 or below; (b) raising the pH of the aqueous drilling fluid produced in step (a) to about 10 or above when the aqueous drilling fluid is circulated downwardly through the drill pipe and drill bit so that the aqueous drilling fluid is foamed and readily lifts the cuttings produced by the drill bit to the surface; (c) lowering the pH of the foamed aqueous drilling fluid to about 5 or below when the foamed aqueous drilling fluid and cuttings reach the surface so that the foamed aqueous drilling fluid is defoamed and the cuttings can be readily separated from the aqueous drilling fluid; and (d) separating the cuttings from the aqueous drilling fluid and repeating steps (a), (b) and (c) until said well bore is drilled to total depth.

A more preferred method of drilling a well bore comprises the steps of: (a) providing an aqueous drilling fluid containing a single tertiary alkylamine ethoxylate foaming and defoaming surfactant, the surfactant causing the aqueous drilling fluid to foam when mixed with air and the aqueous drilling fluid has a pH of about 10 or above and causing the aqueous drilling fluid to defoam when the aqueous drilling fluid has a pH of about 5 or below; (b) raising the pH of the aqueous drilling fluid containing the surfactant to about 10 or above, combining the aqueous drilling fluid with air and circulating the combined aqueous drilling fluid and air through a rotary drill pipe and a drill bit connected thereto whereby foam produced from the combined aqueous drilling fluid and air lifts well bore cuttings produced by the drill bit to the surface; (c) lowering the pH of the foamed aqueous drilling fluid to about 5 or below when the foamed aqueous drilling fluid and cuttings reach the surface so that the foamed aqueous drilling fluid is defoamed and the cuttings can be readily separated from the aqueous drilling fluid; and (d) separating the cuttings from the aqueous drilling fluid and repeating steps (a), (b) and (c) until the well bore is drilled to total depth.

In order to further illustrate the methods of this invention, the following examples are given.

EXAMPLE 1

500 milliliters of fresh water was added to a Waring blender and the pH of the water was adjusted to 11. With vigorous agitation, 5 milliliters of the tertiary alkylamine ethoxylate described herein where $R_1$, $R_2$ and $R_3$ are each alkyl radicals having in the range of from about 12 to about 14 carbon atoms and x and y are each integers in the range of from about 10 to about 15. The agitation was discontinued after 35 seconds and the foamed water was poured into a 1,000 milliliter graduated cylinder. The half life of the foam was determined to be 10 minutes. The foam remaining in the graduated cylinder was collapsed by acidifying the foam to a pH of approximately 4. Sodium hydroxide was added to raise the pH of the solution to 11. A clear solution was again vigorously agitated in a Waring blender and the solution was fully foamed in 30 seconds.

Again, the foam was poured into a 1,000 milliliter graduated cylinder and the half life was determined to be 10 minutes. Thus, this test procedure demonstrates the recycling ability of the tertiary alkylamine ethoxylate foaming and defoaming surfactant utilized in accordance with this invention.

EXAMPLE 2

A one-half percent solution of hydroxyethylcellulose gelling agent was prepared. The pH of the gelled solution was raised to 11. Approximately 5 pounds per gallon of the tertiary alkylamine ethoxylate described in Example 1 was added to the gelled solution. The solution was vigorously agitated for 30 seconds resulting in a stable foam. The foam was observed for over 2 hours during which time it did not collapse. The foam was then acidized with glacial acetic acid to a pH of 4. The foam immediately collapsed leaving a thin solution. The pH of the solution was raised to 11 which resulted in a stable foam after re-agitation. Thus, the cycling method of this invention utilizing a tertiary alkylamine ethoxylate foaming and defoaming surfactant was illustrated.

Thus, the present invention is well adapted to carry out the objects and attain the end and advantages mentioned as well as those which are inherent therein. While numerous changes may be made by those skilled in the art, such changes are encompassed within the spirit of this invention as defined by the appended claims.

What is claimed is:

1. In a method of drilling a well bore whereby an aqueous drilling fluid and a gas is circulated downwardly through a rotary drill pipe and a drill bit connected thereto and well bore cuttings generated by the drill bit are lifted to the surface by a foamed aqueous drilling fluid produced from the aqueous drilling fluid and gas, the foamed aqueous drilling fluid is defoamed whereby the cuttings and gas are removed therefrom and the aqueous drilling fluid is recirculated, the improvement which comprises the steps of:

(a) combining a gas and a single tertiary alkylamine ethoxylate foaming and defoaming surfactant with said aqueous drilling fluid, said surfactant causing said aqueous drilling fluid to foam at an aqueous drilling fluid pH of 10 or above and causing said aqueous drilling fluid to defoam at an aqueous drilling fluid pH of about 5 or below;

(b) raising the pH of said aqueous drilling fluid produced in step (a) to about 10 or above when said aqueous drilling fluid is circulated downwardly through said drill pipe and said drill bit so that said aqueous drilling fluid is foamed and readily lifts said cuttings to the surface;

(c) lowering the pH of said foamed aqueous drilling fluid to about 5 or below when said foamed aqueous drilling fluid and cuttings reach the surface so that said foamed aqueous drilling fluid is defoamed and said cuttings can be readily separated from said aqueous drilling fluid; and (d) separating said cuttings from said aqueous drilling fluid and repeating steps (a), (b) and (c) until said well bore is drilled to total depth.

2. The method of claim 1 wherein said tertiary alkylamine ethoxylate surfactant has the following structural formula when said aqueous drilling fluid pH is raised to about 10 or above in accordance with step (b)

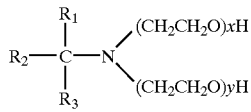

wherein $R_1$, $R_2$ and $R_3$ are each alkyl radicals having in the range of from about 12 to about 14 carbon atoms; and x and y are each integers in the range of from about 2 to about 15.

3. The method of claim 2 wherein $R_1$, $R_2$ and $R_3$ each have 14 carbon atoms.

4. The method of claim 2 wherein x and y are each integers in the range of from about 10 to about 15.

5. The method of claim 1 wherein said tertiary alkylamine ethoxylate surfactant has the following structural formula when said aqueous drilling fluid pH is lowered to about 5 or below in accordance with step (b)

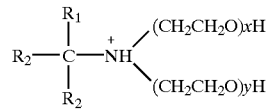

wherein $R_1$, $R_2$ and $R_3$ are alkyl radicals having in the range of from about 12 to about 14 carbon atoms; and x and y are integers in the range of from about 2 to about 15.

6. The method of claim 5 wherein $R_1$, $R_2$ and $R_3$ each have 14 carbon atoms.

7. The method of claim 5 wherein x and y are each integers in the range of from about 10 to about 15.

8. The method of claim 1 wherein said gas combined with said aqueous drilling fluid in step (a) is air.

9. The method of claim 1 wherein said tertiary alkylamine ethoxylate foaming and defoaming surfactant is combined with said aqueous drilling fluid in accordance with step (a) in an amount in the range of from about 0.1% to about 5% by volume of said aqueous drilling fluid.

10. The method of claim 1 wherein the pH of said aqueous drilling fluid is raised to about 10 or above in accordance with step (b) by combining a base with said aqueous drilling fluid.

11. The method of claim 10 wherein said base is selected from the group consisting of sodium hydroxide, sodium carbonate, potassium hydroxide and hydrated lime.

12. The method of claim 10 wherein said base is sodium carbonate.

13. The method of claim 1 wherein the pH of said aqueous drilling fluid is lowered to about 5 or below in accordance with step (c) by combining an acid with said aqueous drilling fluid.

14. The method of claim 13 wherein said acid is selected from the group consisting of glacial acetic acid, hydrochloric acid, sulfuric acid and formic acid.

15. The method of claim 13 wherein said acid is glacial acetic acid.

16. A method of drilling a well bore comprising the steps of:

(a) providing an aqueous drilling fluid containing a single tertiary alkylamine ethoxylate foaming and defoaming surfactant, said surfactant causing said aqueous drilling fluid to foam when mixed with air and said aqueous drilling fluid has a pH of about 10 or above and causing said aqueous drilling fluid to defoam when said aqueous drilling fluid has a pH of about 5 or below;

(b) raising the pH of said aqueous drilling fluid containing said surfactant to about 10 or above, combining said aqueous drilling fluid with air and circulating the combined aqueous drilling fluid and air through a rotary drill pipe and a drill bit connected thereto whereby foam produced from said combined aqueous drilling fluid and air lifts well bore cuttings produced by said drill bit to the surface;

(c) lowering the pH of said foamed aqueous drilling fluid to about 5 or below when said foamed aqueous drilling fluid and cuttings reach the surface so that said foamed aqueous drilling fluid is defoamed and said cuttings can be readily separated from said aqueous drilling fluid; and (d) separating said cuttings from said aqueous drilling fluid and repeating steps (a), (b) and (c) until said well bore is drilled to total depth.

17. The method of claim 16 wherein said tertiary alkylamine ethoxylate surfactant has the following structural formula when said aqueous drilling fluid pH is raised to about 10 or above in accordance with step (b)

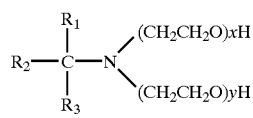

wherein $R_1$, $R_2$ and $R_3$ are each alkyl radicals having about 14 carbon atoms; and x and y are each integers in the range of from about 10 to about 15.

18. The method of claim 16 wherein said tertiary alkylamine ethoxylate surfactant has the following structural formula when said aqueous drilling fluid pH is lowered to about 5 or below in accordance with step (b)

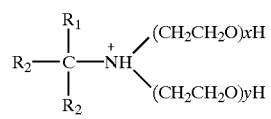

wherein $R_1$, $R_2$ and $R_3$ are each alkyl radicals having about 14 carbon atoms; and x and y are each integers in the range of from about 10 to about 15.

19. The method of claim 16 wherein said tertiary alkylamine ethoxylate foaming and defoaming surfactant is present in said aqueous drilling fluid provided in accordance with step (a) in an amount in the range of from about 0.1% to about 5% by weight of said aqueous drilling fluid.

20. The method of claim 16 wherein the pH of said aqueous drilling fluid is raised to about 10 or above in accordance with step (b) by combining a base with said aqueous drilling fluid.

21. The method of claim 20 wherein said base is sodium carbonate.

22. The method of claim 16 wherein the pH of said aqueous drilling fluid is lowered to about 5 or below in accordance with step (c) by combining an acid with said aqueous drilling fluid.

23. The method of claim 22 wherein said acid is glacial acetic acid.

* * * * *